United States Patent [19]

Borchardt

[11] Patent Number: 4,524,003

[45] Date of Patent: Jun. 18, 1985

[54] METHOD OF VISCOSIFYING AQUEOUS FLUIDS AND PROCESS FOR RECOVERY OF HYDROCARBONS FROM SUBTERRANEAN FORMATIONS

[75] Inventor: John K. Borchardt, Duncan, Okla.

[73] Assignee: Halliburton Company, Duncan, Okla.

[21] Appl. No.: 483,090

[22] Filed: Apr. 8, 1983

[51] Int. Cl.³ ............................................. C09K 3/00
[52] U.S. Cl. ........................ 252/8.55 R; 252/8.55 C; 252/8.55 D; 524/44; 524/55; 166/274; 166/275
[58] Field of Search ............... 252/8.55 R, 8.55 D, 252/8.55 C, 316; 166/294, 295, 283, 270, 307, 308, 246; 524/44, 55; 106/197 R, 205

[56] References Cited

U.S. PATENT DOCUMENTS

| | | | |
|---|---|---|---|
| 2,827,964 | 3/1958 | Sandiford et al. | 166/9 |
| 3,000,790 | 9/1961 | Jeanes et al. | 195/31 |
| 3,007,879 | 11/1961 | Jordan | 252/352 |
| 3,039,529 | 6/1962 | McKennon | 166/9 |
| 3,046,272 | 7/1962 | Strating et al. | 260/233.3 |
| 3,136,360 | 6/1964 | Ramos et al. | 166/12 |
| 3,223,163 | 12/1965 | Koch et al. | 166/33 |
| 3,308,885 | 3/1967 | Sandiford | 166/33 |
| 3,334,689 | 8/1967 | McLaughlin | 166/33 |
| 3,367,418 | 2/1968 | Routson | 166/9 |
| 3,374,834 | 3/1968 | Ramos et al. | 166/33 |
| 3,376,282 | 4/1968 | Schweiger | 260/209.6 |
| 3,405,106 | 10/1968 | Scanley | 260/80 |
| 3,406,754 | 10/1968 | Gogarty | 166/9 |
| 3,421,584 | 1/1969 | Eilers et al. | 166/33 |
| 3,467,647 | 9/1969 | Benninga | 260/209 |
| 3,502,149 | 3/1970 | Pence, Jr. | 166/295 |
| 3,557,562 | 1/1971 | McLaughlin et al. | 61/41 |
| 3,649,574 | 3/1972 | Cole | 260/17.4 |
| 3,658,734 | 4/1972 | Pettitt | 260/17.4 |
| 3,765,918 | 10/1973 | Jordan et al. | 252/8.55 R |
| 3,780,806 | 12/1973 | Bott | 252/8.55 |
| 3,829,412 | 8/1974 | Kunz | 260/209 |
| 3,857,443 | 12/1974 | Cole | 166/295 |
| 3,926,258 | 12/1975 | Hessert et al. | 166/294 |
| 3,973,629 | 8/1976 | Knight et al. | 166/295 |
| 4,016,086 | 4/1977 | Norton et al. | 252/8.55 |
| 4,038,206 | 7/1977 | Karl | 252/8.55 R |
| 4,040,484 | 8/1977 | Hessert | 252/316 |
| 4,043,921 | 8/1977 | Hessert et al. | 252/8.5 |
| 4,058,509 | 11/1977 | Menard et al. | 260/79.7 |
| 4,060,132 | 11/1977 | Chiesa, Jr. | 252/8.05 |
| 4,060,490 | 11/1977 | Bernard | 252/8.55 |
| 4,217,230 | 8/12/80 | Hunter | 252/8.55 |
| 4,217,955 | 8/19/80 | Sigmund et al | 166/252 |
| 4,217,956 | 8/19/80 | Goss et al. | 166/272 |
| 4,217,957 | 8/19/80 | Schievelbein | 252/8.55 |
| 4,297,226 | 10/27/81 | Hunter | 252/8.55 |
| 4,335,787 | 6/22/82 | Stapp | 252/8.55 |
| 4,094,795 | 6/1978 | DeMartino et al. | 252/8.55 |
| 4,098,337 | 7/1978 | Argabright et al. | 166/270 |
| 4,104,193 | 8/1978 | Carter et al. | 252/8.55 |
| 4,137,400 | 1/1979 | DeMartino et al. | 252/8.55 |
| 4,137,969 | 2/1979 | Phalangas et al. | 252/8.55 |
| 4,146,486 | 3/1979 | Hessert et al. | 252/8.55 |
| 4,146,705 | 3/1979 | Knutson, Jr. | 252/316 |
| 4,149,599 | 4/1979 | Chiesa, Jr. | 252/316 |
| 4,162,925 | 7/1979 | Tiefenthaler et al. | 252/316 |
| 4,169,798 | 10/1979 | DeMartino | 252/8.55 |
| 4,169,818 | 10/1979 | DeMartino | 252/8.5 |
| 4,172,055 | 10/1979 | DeMartino | 252/8.5 |
| 4,178,265 | 12/1979 | Matsuda et al. | 252/316 |
| 4,191,657 | 3/1980 | Swanson | 252/8.55 |
| 4,216,828 | 8/1980 | Blair, Jr. | 252/8.55 |
| 4,217,146 | 8/1980 | Avdzhiev et al. | 252/8.55 |

*Primary Examiner*—Josephine L. Barr
*Attorney, Agent, or Firm*—Robert A. Kent; Thomas R. Weaver

[57] ABSTRACT

The present invention relates to a method of viscosifying aqueous fluids and a viscosifying composition which when admixed with an aqueous fluid produces a viscosity increase in the fluid in excess of the additive viscosity of the individual composition components. The viscosifying composition comprises at least one member selected from the group consisting of (i) sulfonated guar and a compound comprising at least one member selected from the group consisting of xanthan gum, guar, hydroxypropyl guar, hydroxypropyl guar derivatives, hydroxyethyl cellulose and hydroxyethyl cellulose derivatives and (ii) cationic guar and a compound comprising at least one member selected from the group consisting of hydroxypropyl guar, hydroxypropyl guar derivatives, hydroxyethyl cellulose and hydroxyethyl cellulose derivatives.

15 Claims, No Drawings

METHOD OF VISCOSIFYING AQUEOUS FLUIDS AND PROCESS FOR RECOVERY OF HYDROCARBONS FROM SUBTERRANEAN FORMATIONS

BACKGROUND OF THE INVENTION

1. Field of the Invention

The present invention relates to the treatment of subterranean hydrocarbon-containing formations with viscous aqueous polymer solutions, and particularly, to the use of such polymer solutions for enhancing the production of hydrocarbons from subterranean hydrocarbon-containing formations penetrated by one or more well bores.

2. Prior Art

Viscous aqueous solutions containing organic polymers previously have been utilized for carrying out a variety of treatments in subterranean hydrocarbon-containing formations to increase the production of hydrocarbons therefrom. For example, in the production of oil and gas wells which also produce large volumes of salt water, the cost of producing the salt water, separating it from produced oil and gas and disposing of the salt water represents an economic loss in the operation of the wells. In order to reduce the production of salt water from such wells, viscous aqueous polymer solutions have heretofore been utilized to preferentially reduce water production from portions of the producing subterranean formations. The high molecular weight polymers or copolymers in the aqueous polymer solution plug the pores of the portions of the formation producing water and thereby substantially reduce the permeability of such portions whereby water production is also substantially reduced.

Acid treating or acidizing of porous subterranean formations penetrated by a well bore has been widely employed for increasing the production of fluids, such as crude oil, natural gas and the like from said formations. The usual technique of acidizing a formation comprises introducing a non-oxidizing acid into the well under sufficient pressure to force the acid out into the formation where it reacts with the acid-soluble components of the formation.

During the acid treating operation, passageways for fluid flow are created in the formation, or existing passageways therein are enlarged, thus stimulating the production of fluids from the formation. This action of the acid on the formation is often called etching.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent to and surrounding the well bore. The severity of the problem increases as the well temperature increases because acid reactivity with the formation increases with increasing temperatures, such as are encountered in deeper wells.

Poor penetration can be also either caused or aggravated by fluid loss to the more porous zones of the formation where low permeability is not a problem. Poor penetration can also be either caused or aggravated by leak-off at the fracture faces in combination fracturing-acidizing operations. Either said fluid loss or said leak-off can frequently worsen the situation by leaving the tight (low permeability) zones of the formation unchanged by merely penetrating the already high permeability zones.

Higher viscosities are also advantageous in combination fracturing-acidizing operations in that the more viscous acidic solutions produce wider and longer fractures. More viscous acid solutions are also more effective in carrying propping agents into the formation when propping agents are used.

Viscous aqueous fluids containing organic polymers also are used as completion fluids when conducting downhole operations after initial drilling or while waiting to put the well into production. Completion fluids are used to control formation fluid pressure before the well is put on production and while mechanical work is being performed on the formation, for example, perforating, underreaming, milling or the like. The loss of completion fluids to the formation is undesirable. The fluid loss generally can be reduced by increasing the viscosity of the completion fluid.

It would be desirable to provide a method by which an aqueous fluid can be viscosified with a polymer or mixture of polymers which minimizes the quantities of polymer required to recover hydrocarbons from subterranean hydrocarbon-containing formations penetrated by one or more well bores.

SUMMARY OF THE INVENTION

The surprising discovery now has been made that when sulfonated guar and a compound comprising at least one member selected from the group consisting of xanthan gum, guar, hydroxypropyl guar, hydroxypropyl guar derivatives, hydroxyethyl cellulose and hydroxyethyl cellulose derivatives or cationic guar and a compound comprising at least one member selected from the group consisting of hydroxypropyl guar, hydroxypropyl guar derivatives, hydroxyethyl cellulose and hydroxyethyl cellulose derivatives, are admixed with an aqueous fluid that a viscous aqueous fluid is produced having a viscosity greater than the viscosities of solutions containing the individual compounds at the same total polymer concentration.

The viscous aqueous fluid can be used in enhanced oil recovery processes employing conventional formation flooding techniques to recover oil from a subterranean formation. The viscous aqueous fluid also can be used as a packer fluid, perforating fluid, completion fluid and for gelling acid solutions used in the treatment of subterranean hydrocarbon-containing formations.

DESCRIPTION OF THE PREFERRED EMBODIMENT

The present invention relates to a viscosifying composition which, when added to an aqueous fluid, produces an increase in viscosity of the aqueous fluid in excess of that which would be produced by equal quantities of the components of the composition. The viscosifying composition comprises sulfonated guar and a compound comprising at least one member selected from the group consisting of xanthan gum, guar, hydroxypropyl guar, hydroxypropyl guar derivatives, hydroxyethyl cellulose and hydroxyethyl cellulose derivatives or cationic guar and a compound comprising at least one member selected from the group consisting of hydroxypropyl guar, hydroxypropyl guar derivatives, hydroxyethyl cellulose and hydroxyethyl cellulose derivatives.

The molar degree of substitution (M.S.) which is defined as the number of moles of hydroxyalkyl groups per mole of polymer repeat unit is in the range of from about 0.1 to about 3.0. When the alkyl substituent is ethyl, perferably, the M.S. is in the range of from about 1.0 to about 3.0. When the alkyl substituent is propyl, preferably, the M.S. is in the range of from about 0.3 to about 2.0.

The sulfonated guar, cationic guar and other compounds which are employed in the viscosifying composition of the present invention are capable of manufacture by processes well known to those individuals skilled in the art.

The sulfonated guar preferably has a degree of substitution (D.S.) in the range of from about 0.05 to about 1.0. The degree of substitution is defined herein as the average member of hydroxyl groups in the polymer repeat unit which have undergone a chemical reaction to form a different chemical group. Most preferably, the degree of substitution is in the range of from about 0.05 to about 0.2.

The cationic guar preferably has a degree of substitution (D.S.) in the range of from about 0.05 to about 1.0. Most preferably, the degree of substitution is in the range of from about 0.1 to about 0.25. The cationic substituent can comprise, for example, a quaternary ammonium group, such as trimethylammonium.

The weight ratio of the sulfonated guar to the xanthan gum, guar, hydroxypropyl guar, hydroxypropyl guar derivatives, hydroxethylcellulose and hydroxyethyl cellulose derivatives and admixtures thereof is in the range of from about 1 to 10 to about 10 to 1. Preferably, the ratio is in the range of from about 1 to 5 to about 5 to 1.

The weight ratio of the cationic guar to the hydroxypropyl guar, hydroxypropyl guar derivatives, hydroxyethylcellulose, hydroxethylcellulose derivatives and admixtures thereof is in the range of from about 1 to 10 to about 10 to 1. Preferably, the ratio is in the range of from about 1 to 5 to about 5 to 1.

The viscosifying composition is admixed with an aqueous fluid which is to be viscosified in an amount sufficient to provide a concentration of at least about 250 parts per million (ppm). When the viscosifying composition is to be used in the formulation of packer fluids, perforating fluids, completion fluids or to gel acid solutions, the composition, preferably, is present in an amount sufficient to provide a concentration of at least about 1,250 ppm and, most preferably, in a concentration of at least about 2,500 ppm. Preferably, when the viscosifying composition is to be used to effect enhanced oil recovery utilizing formation flooding techniques, the composition is present in an amount of from about 250 ppm to about 5,000 ppm and, most preferably, about 1,500 ppm to about 2,500 ppm.

When the viscosifying composition is used to viscosify packer fluids, completion fluids, perforation fluids or to gel acids or the like, a sufficient quantity of the viscosifying composition is admixed with the aqueous fluid to provide a desired viscosity.

The aqueous fluid which is to be viscosified can comprise fresh water, formation water, brine, aqueous acidic solutions or the like. The aqueous fluid can comprise any aqueous solution which does not adversely react with the viscosifying composition.

Acids useful in the practice of the invention include any acid which is compatible with the viscosifying composition and which is effective in increasing the flow of fluids, that is, hydrocarbons, through the formation and into the well. Thus, under proper conditions of use, examples of such acids can include inorganic acids such as hydrochloric acid, phosphoric acid, nitric acid, and sulfuric acid; $C_1$–$C_4$ organic acids such as formic acid, acetic acid, propionic acid, butyric acid, and mixtures thereof; and combinations of inorganic and organic acids. The non-oxidizing acids are preferred. The concentration or strength of the acid can vary depending upon the type of acid, the type of formation being treated, the above-stated compatibility requirements, and the results desired in the particular treating operation. Generally speaking, the concentration can vary from 0.4 to about 60 weight percent, depending upon the type of acid, with concentrations within the range of 10 to 50 weight percent usually preferred, based upon the total weight of the gelled acidic composition. When an inorganic acid such as hydrochloric acid is used, it is presently preferred to use an amount which is sufficient to provide an amount of HCl within the range of from 0.4 to about 35, more preferably, at least about 10, weight percent based on the total weight of the gelled acidic composition. Amounts within the range of about 10 to about 30 weight percent will frequently be practical amounts to use. The acids used in the practice of the invention can contain any of the known corrosion inhibitants, friction reducers, etc., known in the art, and which do not adversely react with the composition of the present invention.

In the use of the viscosifying composition of the present invention in preparing gelled acids, any suitable method can be employed for preparing the gelled acidic compositions. Thus, any suitable mixing technique or order of addition of the components of said gelled acid composition to each other can be employed. However, it is ordinarily preferred to first dissolve or disperse the viscosifying composition in an aqueous fluid before contacting the viscous fluid with acid.

It is within the scope of the invention to precede the injection of the gelled acidic composition into the well and out into the formation with a preflush of a suitable cooling fluid, such as, water. Such fluids serve to cool the well tubing and formation and extend the useful operating temperature range of the viscosified compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

Propping agents can be included in the gelled acidic compositions of the invention, if desired. Propping agents which can be used include any of those known in the art, such as, sand grains, tempered glass beads, sintered bauxite and similar materials. Generally speaking, it is desirable to use propping agents having particle sizes in the range of 8 to 40 mesh (U.S. Sieve Series).

However, particle sizes outside this range can be employed. When propping agents are used they should be made of materials which are not severely attacked by the acid used during the time they are exposed to said acid.

In the use of the viscosifying composition of the present invention in enhanced oil recovery, a conventional water flooding procedure is employed. The viscosified aqueous fluid is prepared by admixing a quantity of the viscosifying composition with an aqueous fluid. The viscosified aqueous fluid then is forced down an injection well penetrating a subterranean hydrocarbon-containing formation and out into the formation by means of conventional pumping equipment located at the wellhead. In the interest of economy, it is preferred to employ the viscosified aqueous fluid in an amount sufficient only to form a flooding front and to follow the viscosified aqueous fluid with additional quantities of the aqueous fluid. Accordingly, after the viscous aqueous fluid has been forced into the injection wells for a period of time sufficient to insure an adequate thickness of viscous flooding front within the formation, its injection is terminated and unviscosified aqueous fluid is injected behind the viscous aqueous fluid to advance the viscous fluid in the formation and force at least a portion of the contained hydrocarbons toward a producing well or wells for recovery therefrom.

The amount of the viscous aqueous fluid required to provide a flooding front of adequate thickness will depend upon the distance between the injection and producing wells and their spacing as well as the porosity of the intervening formation. Desirably, the volume of viscous aqueous fluid should correspond to from about 1 to about 100 percent of the volume of the hydrocarbon pore space of the subterranean formation, however, larger quantities may be employed. Preferably, the volume of viscous aqueous fluid should be in the range of from about ten to fifty percent of the volume of the hydrocarbon pore space.

The viscosified aqueous fluid of the present invention also can contain organic polymer clay or fines stabilizers such as, for example, poly(diallyldimethylammonium chloride), poly(epichlorohydrin-co-dimethylamine) and poly(methacrylamido-4,4,8,8-tetramethyl-4,8-diaza-6-hydroxynonamethylene dichloride). The organic polymer clay or fine stabilizers can be dissolved in the aqueous fluid used to form the viscous aqueous fluid, or admixed with the viscous aqueous fluid prior to injection into the subterranean formation. Other additives such as biocides, surfactants and the like also can be admixed with the viscous aqueous fluid.

It has been found that when the viscous aqueous fluid of the present invention is subjected to high shear conditions the viscosity of the fluid is substantially reduced. Surprisingly, upon cessation or reduction in the shear rate, the fluid viscosity increases to substantially the original viscosity of the fluid. Therefore, no formal chemical bonds are believed to be formed between the constituents of the viscosifying composition. While the process presently is unknown, it is believed that the components of the viscosifying composition undergo either molecular chain entanglement or polar interaction or both to form a network-type structure upon hydration which results in the enhanced viscosity of the aqueous fluid.

The viscosifying composition of the present invention can be used in fluids having a temperature of from about ambient or below to in excess of about 250° F.

To illustrate the unexpected viscosity enhancement which results from use of the viscosifying composition of the present invention, and not by way of limitation, the following examples are provided.

EXAMPLE I

To illustrate the unique viscosity enhancement which results from use of the viscosifying composition of the present invention, the following tests were performed. Various solutions were prepared in deionized water utilizing the compounds set forth in the following table at the designated concentrations. A quantity of a selected component is admixed with a second component in an aqueous solution to determine whether or not any viscosity enhancement occurred. The viscosity of each of the solutions is determined on a Brookfield LVT viscometer. The spindle number and rpm used in the test are identified in the table. The percentage of viscosity enhancement is determined by the following equation:

$$\% \text{ viscosity enhancement} = \frac{N_{1+2} - (N_1 + N_2)}{N_1 + N_2} \times 100$$

where
$N_1$ = viscosity of solution containing only the first component, centipoise
$N_2$ = viscosity of solution containing only the second component, centipose
$N_{1+2}$ = viscosity of solution containing both components, centipoise.

TABLE 1

| First Component | Concentration (ppm) | Second Component | Concentration (ppm) | Viscometer Test Conditions | Viscosity (cp) | Percent Viscosity Enhancement |
|---|---|---|---|---|---|---|
| Sulfonated guar (degree of sulfonation, 0.10) | 5,000 | — | — | 3, 30 | 716 | — |
| — | — | hydroxyethyl cellulose (M.S. 2.5) | 5,000 | 3, 30 | 270 | — |
| sulfonated guar | 5,000 | hydroxyethyl cellulose | 5,000 | 3, 30 | 3,776 | 383 |
| sulfonated guar | 2,500 | — | — | 2, 30 | 61 | — |
| — | — | hydroxyethyl cellulose | 2,500 | 2, 30 | 34 | — |
| sulfonated guar | 2,500 | hydroxyethyl cellulose | 2,500 | 2, 30 | 366 | 385 |
| sulfonated guar | 5,000 | — | — | 3, 30 | 664 | — |
| — | — | carboxymethylhydroxyethylcellulose (D.S. 0.4; M.S. 2.4) | 5,000 | 3, 30 | 216 | — |
| sulfonated guar | 5,000 | carboxymethylhydroxyethylcellulose | 5,000 | 3, 30 | 216 | — |

TABLE 1-continued

| First Component | Concentration (ppm) | Second Component | Concentration (ppm) | Viscometer Test Conditions | Viscosity (cp) | Percent Viscosity Enhancement |
|---|---|---|---|---|---|---|
| sulfonated guar | 2,500 | — | — | 2, 30 | 3,464 | 433 |
| — | — | carboxymethylhydroxyethylcellulose | 2,500 | 2, 30 | 61 | — |
| sulfonated guar | 2,500 | carboxymethylhydroxyethylcellulose | 2,500 | 2, 30 | 460 | 430 |
| sulfonated guar | 5,000 | — | — | 2, 6 | 750 | — |
| — | — | hydroxypropyl guar 1 (D.S. 0.35–0.45) | 5,000 | 2, 6 | 75 | — |
| sulfonated guar | 5,000 | hydroxypropyl guar 1 | 5,000 | 2, 6 | 3,935 | 477 |
| sulfonated guar | 5,000 | carboxymethylhydroxypropyl guar (D.S. 0.3; M.S. 0.6) | — | 3, 6 | 880 | — |
| — | — | carboxymethylhydroxypropyl guar | 5,000 | 3, 6 | 1,110 | — |
| sulfonated guar | 5,000 | carboxymethylhydroxypropyl guar | 5,000 | 3, 6 | 18,360 | 923 |
| cationic guar 1 (D.S. 0.13) | 5,000 | — | — | 3, 12 | 702 | — |
| — | — | hydroxyethylcellulose | 5,000 | 3, 12 | 422 | — |
| cationic guar 1 | 2,500 | hydroxyethylcellulose | 2,500 | 3, 12 | 6,355 | — |
| cationic guar 1 | 5,000 | hydroxyethylcellulose | 5,000 | 3, 12 | 7,480 | 565 |
| cationic guar 2 (D.S. 0.17) | 5,000 | — | — | 2, 30 | 220 | — |
| cationic guar 2 | 2,500 | — | — | 2, 30 | 58 | — |
| cationic guar 2 | 1,250 | — | — | 2, 30 | 28 | — |
| — | — | hydroxypropyl guar 1 (M.S. 0.35–0.45) | 5,000 | 2, 30 | 450 | — |
| — | — | hydroxypropyl guar 1 | 2,500 | 2, 30 | 450 | — |
| — | — | hydroxypropyl guar 1 | 1,250 | 2, 30 | 8 | — |
| cationic guar 2 | 2,500 | hydroxypropyl guar 1 | 2,500 | 2, 30 | 690 | 670 |
| cationic guar 2 | 1,250 | hydroxypropyl guar 1 | 1,250 | 2, 30 | 125 | 347 |
| — | — | hydroxypropyl guar 2 (M.S. 1.8) | 5,000 | 2, 30 | 140 | — |
| — | — | hydroxypropyl guar 2 | 2,500 | 2, 30 | 18 | — |
| — | — | hydroxypropyl guar 2 | 1,250 | 2, 30 | 5 | — |
| cationic guar 2 (D.S. 0.17) | 2,500 | hydroxypropyl guar 2 | 2,500 | 2, 30 | 85 | 112 |
| cationic guar 2 | 1,250 | hydroxypropyl guar 2 | 1,250 | 2, 30 | 28 | 84 |
| — | — | hydroxypropyl guar 3 (M.S. 1.8) (higher purity) | 5,000 | 3, 30 | 3,540 | — |
| — | — | hydroxypropyl guar 3 | 2,500 | 2, 30 | 330 | — |
| — | — | hydroxypropyl guar 3 | 1,250 | 2, 30 | 42 | — |
| cationic guar 2 (D.S. 0.17) | 2,500 | hydroxypropyl guar 3 | 2,500 | 3, 30 | 2,180 | 562 |
| cationic guar 2 | 1,250 | hydroxypropyl guar 3 | 1,250 | 2, 30 | 370 | 528 |

The data set forth above clearly illustrates the beneficial results which derive from use of the viscosifying composition of the present invention. The enhanced viscosity of the viscous fluid permits substantially lower viscosifying agent concentrations to be employed than otherwise necessary to provide a desired viscosity to a fluid.

EXAMPLE II

To determine whether the enhanced viscosity found to exist in fluids produced with the viscosifying composition of the present invention persists at elevated temperatures, the following tests were performed. Various solutions were prepared in deionized water utilizing the compounds set forth in the following tables at the designated concentration. Samples of the solutions were heated to various temperatures as set forth in Tables II and III and the viscosity of the solutions is determined on a Brookfield LVT viscometer. The spindle number and rpm used in the tests are identified in the footnote to each table.

TABLE II

Solution Viscosity, cp[1]

| Temperature | 5,000 ppm Sulfonated Guar (D.S. 0.10) | 5,000 ppm Hydroxyethyl Cellulose (M.S. 2.5) | 10,000 ppm Hydroxyethyl Cellulose (M.S. 2.5) | 5,000 ppm Sulfonated guar (D.S. 0.10) & 5,000 ppm Hydroxyethyl Cellulose (M.S. 2.5) |
|---|---|---|---|---|
| 72 | 610 | 250 | 6410 | 8050 |
| 80 | 660 | 240 | 6150 | 8140 |
| 90 | 510 | 210 | 4250 | 7500 |
| 100 | 380 | 190 | 3370 | 6000 |
| 110 | 290 | 160 | 2710 | 4610 |
| 125 | 200 | 140 | 1700 | 3070 |
| 150 | 140 | 60 | 800 | 1660 |

[1] Spindle number 2, 3 rpm

TABLE III

| | Solution Viscosity, cp[1] | | | |
|---|---|---|---|---|
| Temperature | 5,000 ppm Cationic Guar[1] (D.S. 0.10) | 5,000 ppm Hydroxyethyl Cellulose (M.S. 2.5) | 10,000 ppm Hydroxyethyl Cellulose (M.S. 2.5) | 5,000 ppm Cationic guar (D.S. 0.13) & 5,000 ppm Hydroxyethyl Cellulose (M.S. 2.5) |
| 72 | 750 | 250 | 6410 | 9320 |
| 80 | 710 | 230 | 6150 | 9040 |
| 90 | 640 | 200 | 4250 | 8000 |
| 100 | 570 | 170 | 3370 | 6810 |
| 110 | 510 | 150 | 2710 | 5540 |
| 125 | 450 | 140 | 1700 | 5100 |
| 150 | 350 | 90 | 800 | 4550 |

[1]Spindle number 2, 3 rpm

The data set forth in Tables II and II clearly illustrate that the viscosity enhancement which occurs upon use of the viscosifying composition of the present invention to viscosify an aqueous fluid persists at elevated temperatures.

While that which presently is considered to be the preferred embodiment of the invention has been described, it is to be understood that variations and modifications which will become apparent to those individuals skilled in the art can be made in this invention without departing from the spirit and scope thereof.

What is claimed is:

1. A method for producing a viscosity increase in an aqueous fluid in excess of the additive viscosity of the individual components of a viscosifying composition comprising:

admixing an aqueous fluid with a viscosifying composition comprising at least one member selected from the group consisting of (i) sulfonated guar having a degree of substitution in the range of from about 0.05 to about 1.0 and at least one compound selected from the group consisting of xanthan gum, guar, hydroxypropyl guar, hydroxypropyl guar derivatives, hydroxyethyl cellulose and hydroxyethyl cellulose derivatives present in a ratio by weight of sulfonated guar to selected compound of from about 1:10 to about 10:1 and (ii) cationic guar having a degree of substitution of from about 0.05 to about 1.0 and at least one compound selected from the group consisting of hydroxypropyl guar, hydroxypropyl guar derivatives, hydroxyethyl cellulose and hydroxyethyl cellulose derivatives present in a ratio by weight of cationic guar to selected compound of from about 1:10 to about 10:1 to produce a viscous aqueous fluid having a viscosity greater than the viscosities of solutions containing the individual compounds at the same total polymer concentration, said viscosifying composition being present in an amount sufficient to provide a concentration of at least about 250 ppm.

2. The method of claim 1 wherein the ratio of sulfonated guar to the xanthan gum, guar, hydroxypropyl guar, hydroxypropyl guar derivatives, hydroxyethyl cellulose, hydroxyethyl cellulose derivatives and admixtures thereof in said viscosifying composition is in the range of from about 1 to 5 to about 5 to 1.

3. The method of claim 1 wherein the ratio of cationic guar to the hydroxypropyl guar, hydroxypropyl guar derivatives, hydroxyethyl cellulose, hydroxyethyl cellulose derivatives and admixtures thereof in said viscosifying composition is in the range of from about 1 to 5 to about 5 to 1.

4. The method of claim 1 wherein said sulfonated guar has a degree of substitution in the range of from about 0.05 to about 0.2.

5. The method of claim 4 wherein said cationic guar has a degree of substitution in the range of from about 0.1 to about 0.25.

6. Method of viscosifying an aqueous fluid comprising:

admixing an aqueous fluid with a viscosifying composition comprising at least one member selected from the group consisting of (i) sulfonated guar having a degree of substitution of from about 0.05 to about 1.0 and at least one compound selected from the group consisting of xanthan gum, guar, hydroxypropyl guar, hydroxypropyl guar derivatives, hydroxyethyl cellulose and hydroxyethyl cellulose derivatives and (ii) cationic guar having a degree of substitution of from about 0.05 to about 1.0 and at least one compound selected from the group consisting of hydroxypropyl guar, hydroxypropyl guar derivatives, hydroxyethyl cellulose and hydroxyethyl cellulose derivatives, to produce a viscous aqueous fluid having a viscosity greater than the viscosities of solutions containing the individual compounds at the same total polymer concentration; and, the ratio of said sulfonated guar to said member selected from xanthan gum, guar, hydroxypropyl guar, hydroxypropyl guar derivatives, hydroxyethylcellulose and hydroxyethyl cellulose derivatives and admixtures thereof being in the range of from about 1 to 10 to about 10 to 1, and, the ratio of said cationic guar to said member selected from hydroxypropyl guar, hydroxypropyl guar derivatives, hydroxyethyl cellulose, hydroxyethyl cellulose derivatives and admixtures thereof being in the range of from about 1 to 10 to about 10 to 1, said viscosifying composition being present in an amount sufficient to provide a concentration of at least about 250 ppm.

7. The method of claim 6 wherein said sulfonated guar has a degree of substitution in the range of from about 0.1 to about 0.2.

8. The method of claim 6 wherein said cationic guar has a degree of substitution in the range of from about 0.1 to about 0.25.

9. A process for treating a subterranean hydrocarbon-containing formation penetrated by at least one well bore comprising:

injecting into said formation through said well bore a viscosified aqueous fluid comprising an aqueous fluid having dissolved therein a viscosifying composition comprising at least one member selected from the group consisting of (i) sulfonated guar having a degree of substitution of from about 0.05 to about 1.0 and at least one compound selected from the group consisting of xanthan gum, guar, hydroxypropyl guar, hydroxypropyl guar derivatives, hydroxyethyl cellulose and hydroxyethyl cellulose derivatives present in a ratio by weight of sulfonated guar to selected compound of from about 1:10 to about 10:1 and (ii) cationic guar having a degree of substitution of from about 0.05 to about 1.0 and at least one compound selected from the group consisting of hydroxypropyl guar, hydroxypropyl guar derivatives, hydroxyethyl cellulose and hydroxyethyl cellulose derivatives present in a ratio by weight of cationic guar to selected compound of from about 1:10 to about 10:1, to produce a viscous aqueous fluid having a viscosity greater than the viscosities of solutions containing the individual compounds at the same total polymer concentration, said viscosifying composition being present in an amount sufficient to provide a concentration of the viscosifying composition of at least about 250 ppm;

forcing said viscosified aqueous fluid into said formation; and recovering hydrocarbons from said formation.

10. The process of claim 9 wherein the ratio of said sulfonated guar to the xanthan gum, guar, hydroxypropyl guar, hydroxypropyl guar derivatives, hydroxyethyl cellulose and hydroxyethyl cellulose derivatives and admixtures thereof in said viscosifying composition is in the range of from about 1 to 5 to about 5 to 1.

11. The process of claim 9 wherein the ratio of hydroxypropyl guar, hydroxypropyl guar derivatives, hydroxyethyl cellulose, hydroxyethyl cellulose derivatives and admixtures thereof in said viscosifying composition is in the range of from about 1 to 5 to about 5 to 1.

12. The process of claim 9 wherein said viscosifying composition is present in an amount sufficient to provide a concentration in the viscosified aqueous fluid of at least about 1250 ppm.

13. The process of claim 9 wherein said aqueous fluid comprises an aqueous acidic solution.

14. The process of claim 13 wherein said viscosified aqueous fluid is forced into said formation at a pressure sufficient to fracture said formation.

15. The process of claim 9 wherein said viscosified aqueous fluid is forced into said formation at a pressure sufficient to fracture said formation.

* * * * *